US012592033B2

(12) United States Patent
Lou

(10) Patent No.: US 12,592,033 B2
(45) Date of Patent: Mar. 31, 2026

(54) METHOD AND APPARATUS FOR DETECTING PICKED OBJECT, COMPUTER DEVICE, READABLE STORAGE MEDIUM, AND COMPUTER PROGRAM PRODUCT

(71) Applicant: Tencent Technology (Shenzhen) Company Limited, Shenzhen (CN)

(72) Inventor: Shuai Lou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 188 days.

(21) Appl. No.: 18/633,935

(22) Filed: Apr. 12, 2024

(65) Prior Publication Data
US 2024/0257455 A1 Aug. 1, 2024

Related U.S. Application Data

(63) Continuation of application No. PCT/CN2023/101333, filed on Jun. 20, 2023.

(30) Foreign Application Priority Data

Aug. 31, 2022 (CN) .......................... 202211069638.1

(51) Int. Cl.
 *G06T 17/00* (2006.01)
(52) U.S. Cl.
 CPC ..................................... *G06T 17/00* (2013.01)
(58) Field of Classification Search
 None
 See application file for complete search history.

(56) References Cited

U.S. PATENT DOCUMENTS

2003/0098881 A1* 5/2003 Nolte .................... G06F 3/0481
 715/764
2016/0353057 A1* 12/2016 Chung ................... H04N 7/147
 (Continued)

FOREIGN PATENT DOCUMENTS

| CN | 111273971 A | 6/2020 |
| CN | 113238692 A | 8/2021 |
| CN | 114047840 A | 2/2022 |

OTHER PUBLICATIONS

Tencent Technology, WO, PCT/CN2023/101333, Oct. 19, 2023, 4 pgs.

(Continued)

*Primary Examiner* — Anh-Tuan V Nguyen
(74) *Attorney, Agent, or Firm* — Morgan, Lewis & Bockius LLP

(57) ABSTRACT
This application relates to a method for detecting a picked object performed by a computer device. The method includes: detecting trigger location information of a trigger operation; in a process of rendering a second image frame by using a graphics processing unit, obtaining location information of a pixel associated with each three-dimensional model in the second image frame, and matching the location information of the pixel associated with each three-dimensional model with the trigger location information; storing, by using the graphics processing unit, a model identifier of a three-dimensional model associated with a pixel with location information successfully matched, to a storage location in a color buffer that corresponds to the successfully matched pixel; and obtaining the model identifier in the color buffer by using a central processing unit, and determining, based on the obtained model identifier, the picked object specified by the trigger operation.

20 Claims, 6 Drawing Sheets

| t0 | t1 | t2 | t3 |
|---|---|---|---|
| Pixel information | Pixel information | Pixel information | Pixel information |
| t4 | t5 | t6 | t7 |
| Pixel information | Pixel information | Model identifier of model B | Pixel information |
| t8 | t9 | t10 | t11 |
| Pixel information | Pixel information | Pixel information | Pixel information |
| t12 | t13 | t14 | t15 |
| Pixel information | Pixel information | Pixel information | Pixel information |

(56) References Cited

U.S. PATENT DOCUMENTS

2019/0310756 A1    10/2019  Vathauer et al.
2021/0084228 A1     3/2021  Wang et al.
2023/0018168 A1*    1/2023  Hovland ................. G06T 15/06

OTHER PUBLICATIONS

Tencent Technology, IPRP, PCT/CN2023/101333, Mar. 1, 2025, 5 pgs.

Tencent Technology, Extended European Search Report, EP Patent Application No. 23858826.3, Mar. 27, 2025, 8 pgs.

OpenGL-Tutorial.org, "Picking with an OpenGL Hack", Apr. 2020, 6 pgs., Retrieved from the Internet: https://www.opengl-tutorial.org/miscellaneous/clicking-on-objects/picking-with-an-opengl-hack/.

Sławomir Orłowski et al., "Material Matrix Generation for FDTD Simulations Using OpenGL", 7th European Conference on Antennas and Propagation (EuCAP), Apr. 2013, 5 pgs.

Tencent Technology, ISR, PCT/CN2023/101333, Oct. 19, 2023, 2 pgs.

* cited by examiner

Step 202

Detect trigger location information of a trigger operation, the trigger operation being performed by a trigger operator in a case that a display interface displays a first image frame, an image frame displayed by the display interface being updated at a preset frequency, and the first image frame being any image frame in an updating process Step 204

Determine, in a process of rendering a second image frame by using a graphics processing unit, each three-dimensional model included in the second image frame, obtain location information of a pixel associated with each three-dimensional model, and match the location information of the pixel associated with each three-dimensional model with the trigger location information, the second image frame being an $N^{th}$ image frame after the first image frame, and N being a positive integer Step 206

Store, by using the graphics processing unit, a model identifier of a three-dimensional model associated with a pixel with location information successfully matched, to a storage location that corresponds to the successfully matched pixel and that is in a color buffer Step 208

Read information in the color buffer by using a central processing unit, obtain the model identifier based on the read information, and determine, based on the obtained model identifier, the picked object specified by the trigger operation

FIG. 2

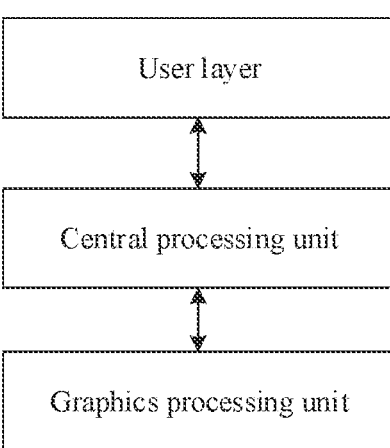

FIG. 3

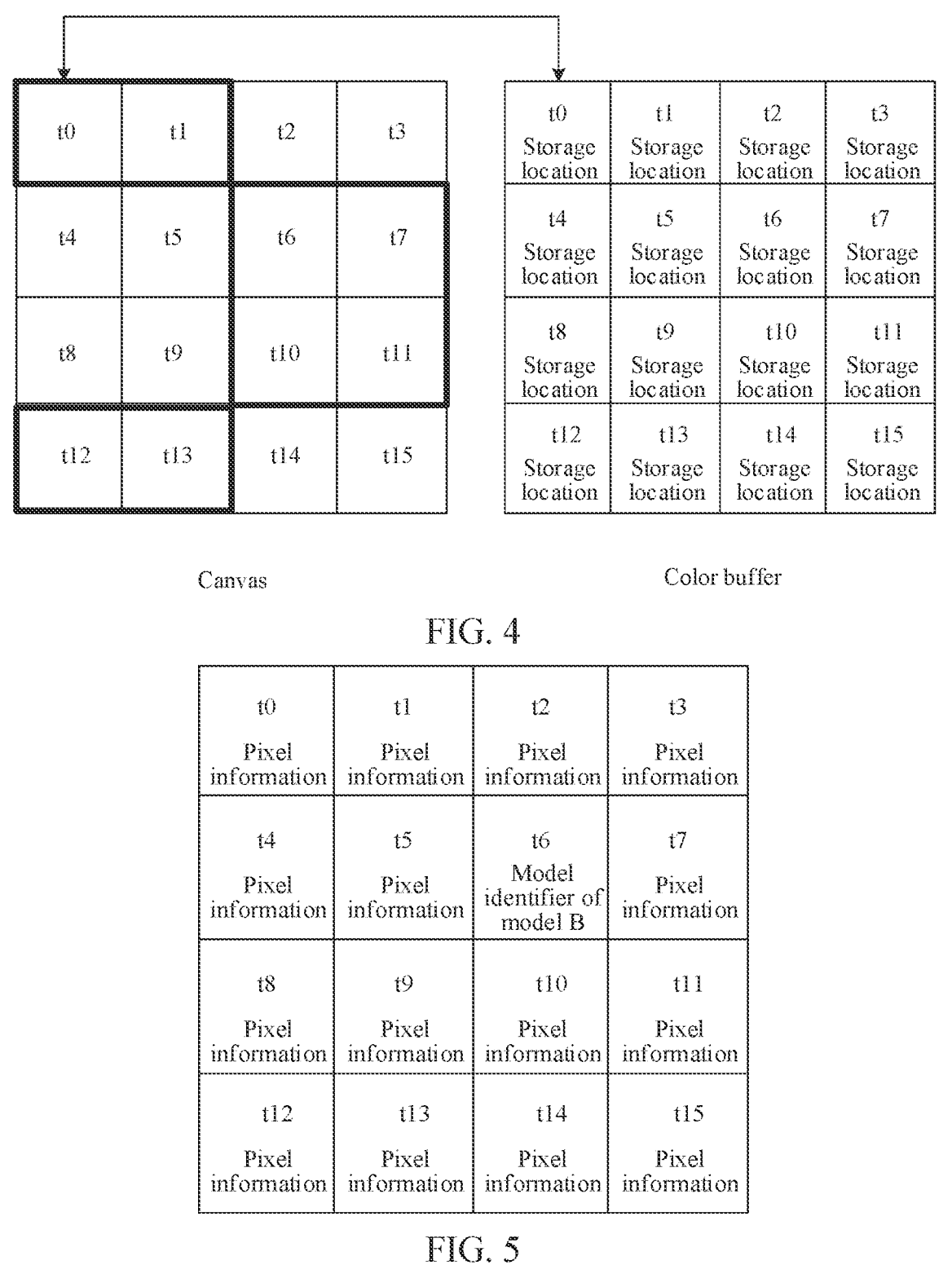

| t0 | t1 | t2 | t3 |
|----|----|----|----|
| t4 | t5 | t6 | t7 |
| t8 | t9 | t10 | t11 |
| t12 | t13 | t14 | t15 |

| t0 Storage location | t1 Storage location | t2 Storage location | t3 Storage location |
|----|----|----|----|
| t4 Storage location | t5 Storage location | t6 Storage location | t7 Storage location |
| t8 Storage location | t9 Storage location | t10 Storage location | t11 Storage location |
| t12 Storage location | t13 Storage location | t14 Storage location | t15 Storage location |

Canvas                                    Color buffer

FIG. 4

| t0 Pixel information | t1 Pixel information | t2 Pixel information | t3 Pixel information |
|----|----|----|----|
| t4 Pixel information | t5 Pixel information | t6 Model identifier of model B | t7 Pixel information |
| t8 Pixel information | t9 Pixel information | t10 Pixel information | t11 Pixel information |
| t12 Pixel information | t13 Pixel information | t14 Pixel information | t15 Pixel information |

FIG. 5

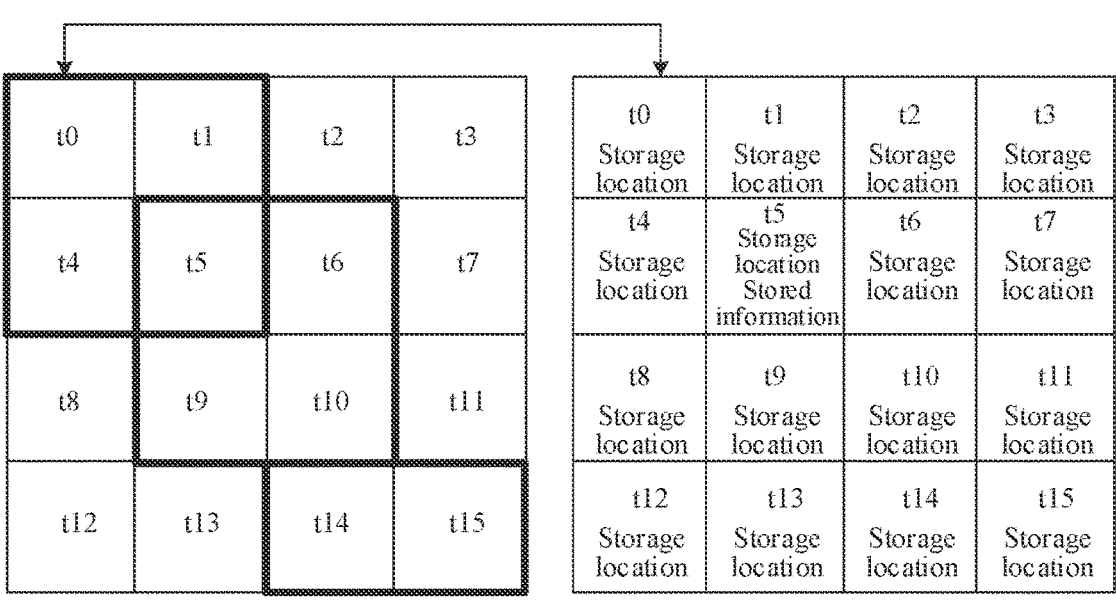

| t0 Storage location | t1 Storage location | t2 Storage location | t3 Storage location |
| t4 Storage location | t5 Storage location Stored information | t6 Storage location | t7 Storage location |
| t8 Storage location | t9 Storage location | t10 Storage location | t11 Storage location |
| t12 Storage location | t13 Storage location | t14 Storage location | t15 Storage location |

Canvas                                    Color buffer

FIG. 6

| t0 Depth Storage location | t1 Depth Storage location | t2 Depth Storage location | t3 Depth Storage location |
|---|---|---|---|
| t4 Depth Storage location | t5 Depth Storage location | t6 Depth Storage location | t7 Depth Storage location |
| t8 Depth Storage location | t9 Depth Storage location | t10 Depth Storage location | t11 Depth Storage location |
| t12 Depth Storage location | t13 Depth Storage location | t14 Depth Storage location | t15 Depth Storage location |

Depth buffer

FIG. 7

| Big endian | Little endian | Check value | 0xFF |
|---|---|---|---|
| R | G | B | A |

FIG. 8

METHOD AND APPARATUS FOR DETECTING PICKED OBJECT, COMPUTER DEVICE, READABLE STORAGE MEDIUM, AND COMPUTER PROGRAM PRODUCT

CROSS-REFERENCE TO RELATED APPLICATIONS

This application is a continuation application of PCT Patent Application No. PCT/CN2023/101333, entitled "METHOD AND APPARATUS FOR DETECTING PICKED OBJECT, COMPUTER DEVICE, READABLE STORAGE MEDIUM, AND COMPUTER PROGRAM PRODUCT" filed on Jun. 20, 2023, which claims priority to Chinese patent application Ser. No. 202211069638.1, entitled "METHOD AND APPARATUS FOR DETECTING PICKED OBJECT, COMPUTER DEVICE, AND STORAGE MEDIUM" filed with the China National Intellectual Property Administration on Aug. 31, 2022, all of which is incorporated herein by reference in its entirety.

FIELD OF THE TECHNOLOGY

This application relates to the field of terminal technologies, and in particular, to a method and apparatus for detecting a picked object, a computer device, a readable storage medium, and a computer program product.

BACKGROUND OF THE DISCLOSURE

With the development of terminal technologies, there are more and more types of applications on a terminal, such as a social application, a shopping application, a navigation application, and a video application. A user may open these applications and click/tap or long press an object presented on a display interface, then the terminal generates a corresponding response. This interaction of an instant response of the terminal can improve the user experience of the applications. Therefore, after the user performs some trigger operations, how the terminal determines which objects the trigger operations of the user are located on becomes an urgent problem to be resolved.

In the conventional technology, a page provided by an application is constantly refreshed. After a user implements a trigger operation, when rendering a next frame of image, a terminal writes pixel information of each object in the next frame of image into a color buffer, and also sets a region covered by each object to a corresponding color in an additional frame buffer based on a pre-configured correspondence between a color and an object. The terminal may determine, based on the frame buffer, which color region the trigger operation is located on, to determine the object triggered by the user.

However, this method involves writing and reading information in the frame buffer, but some terminals do not have the frame buffer in their graphics processing units, so the compatibility of this method is not high.

SUMMARY

According to various embodiments provided in this application, a method and apparatus for detecting a picked object, a computer device, a computer-readable storage medium, and a computer program product are provided.

According to an aspect, this application provides a method for detecting a picked object. The method includes:

detecting trigger location information of a trigger operation when a display interface displays a first image frame, the first image frame being any image frame in an updating process of the display interface being at a preset frequency;

in a process of rendering a second image frame by using a graphics processing unit, obtaining location information of a pixel associated with each three-dimensional model in the second image frame, and matching the location information of the pixel associated with each three-dimensional model with the trigger location information, the second image frame being an Nth image frame after the first image frame, and N being a positive integer;

storing, by using the graphics processing unit, a model identifier of a three-dimensional model associated with a pixel with location information successfully matched with the trigger location information, to a storage location in a color buffer that corresponds to the successfully matched pixel; and obtaining the model identifier in the color buffer by using a central processing unit, and determining, based on the obtained model identifier, the picked object specified by the trigger operation.

According to another aspect, this application further provides a computer device, including a memory and one or more processors, the memory storing computer-readable instructions, and the computer-readable instructions, when executed by the one or more processors, causing the computer device to perform the aforementioned steps.

According to another aspect, this application further provides one or more non-transitory readable storage media, storing computer-readable instructions, the computer-readable instructions, when executed by one or more processors of a computer device, causing the computer device to implement the aforementioned steps.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

FIG. 2 is a schematic flowchart of a method for detecting a picked object according to an embodiment.

FIG. 3 is an architectural diagram of a terminal according to an embodiment.

FIG. 4 is an exemplary diagram of a rendering process according to an embodiment.

FIG. 5 is a schematic diagram of a color buffer according to an embodiment.

FIG. 6 is an exemplary diagram of a rendering process according to another embodiment.

FIG. 7 is a schematic diagram of a depth buffer according to an embodiment.

FIG. 8 is a schematic diagram of a storage location in a color buffer according to an embodiment.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are only used for explaining this application, but are not intended to limit this application.

Figure 1:
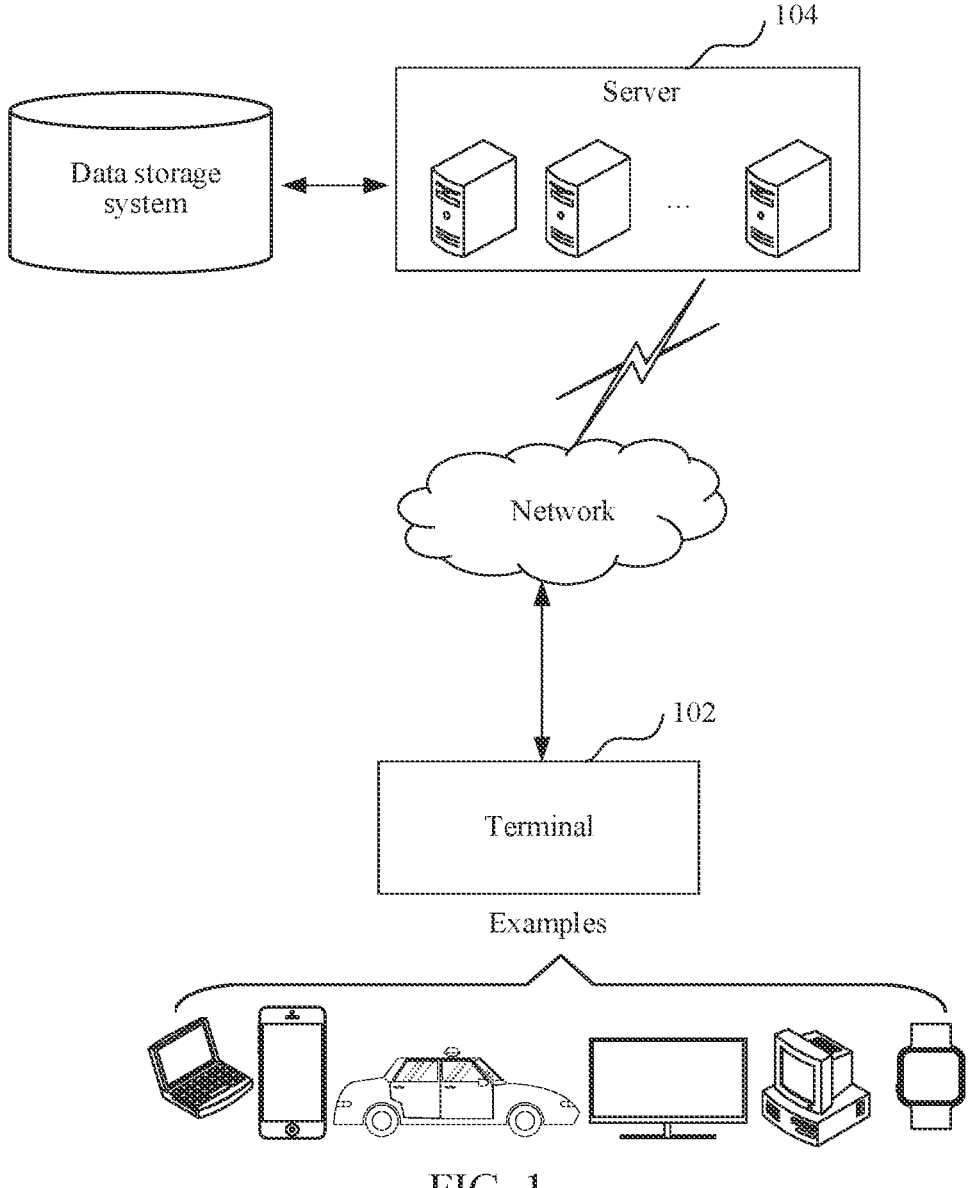
FIG. 1 is a diagram of an application environment of a method for detecting a picked object according to an embodiment.

A method for detecting a picked object provided in the embodiments of this application may be applied to an application environment shown in FIG. 1. A terminal 102 communicates with a server 104 through a network. A data storage system may store data that the server 104 needs to process. The data storage system may be integrated into the server 104, or may be configured on cloud or another server. The method for detecting a picked object provided in the embodiments of this application may be performed by the terminal 102 or the server 104 alone, or may be performed by the terminal 102 and the server 104 together. An example in which the method is performed by the terminal 102 alone is used for description: A user may perform a trigger operation when a display interface displays a first image frame. The terminal 102 may detect trigger location information of the trigger operation, determine, in a process of rendering a second image frame by using a graphics processing unit, each three-dimensional model included in the second image frame, the second image frame being an N$^{th}$ image frame after the first image frame, obtain location information of a pixel associated with each three-dimensional model, and match the location information of the pixel associated with each three-dimensional model with the trigger location information, to determine a pixel with location information successfully matched. A model identifier of a three-dimensional model associated with the pixel with the location information successfully matched is stored by using the graphics processing unit to a storage location that corresponds to the successfully matched pixel and that is in a color buffer. Information in the color buffer is read by using a central processing unit, the model identifier is obtained based on the read information, and the picked object specified by the trigger operation is determined based on the obtained model identifier to implement an operation response.

The terminal 102 may be, but is not limited to, any personal computer, notebook computer, smartphone, tablet computer, internet of things device, or portable wearable device. The internet of things device may be a smart speaker, a smart TV, a smart air conditioner, a smart on-board device, or the like. The portable wearable device may be a smart-watch, a smart band, a headset device, or the like. The server 104 may be an independent physical server, or may be a server cluster or distributed system including a plurality of physical servers, or may be a cloud server providing cloud computing services.

In some embodiments, as shown in FIG. 2, a method for detecting a picked object is provided. An example in which the method is applied to the terminal in FIG. 1 is used for description. The method includes the following steps:

Step 202: Detect trigger location information of a trigger operation, the trigger operation being performed by a trigger operator when a display interface displays a first image frame, an image frame displayed by the display interface being updated at a preset frequency, and the first image frame being any image frame in an updating process.

The display interface may be configured to display a page in an application (APP). The application may be any application that requires a graphics rendering function. For example, the application may be a map application, a video application, or the like. This is not limited in the embodiments of this application.

The page provided by the application may be configured to play multimedia data. The multimedia data may include a video, an animation, a real-time map, and the like. The multimedia data is formed by an image frame. The image frame is updated at a preset frequency. The preset frequency may be a playing frame rate. The trigger operator may perform the trigger operation on an object of interest in the multimedia data according to an actual requirement, and may use an image frame displayed when the trigger operator performs the trigger operation as the first image frame.

The trigger operation may be an operation that can be performed by the trigger operator on the display interface. For example, the trigger operation may be a click/tap operation, a double-click/tap operation, a long-press operation, a slide operation, or the like. This is not limited in the embodiments of this application.

The user may perform the trigger operation by using any body part that can be recognized by the terminal. For example, the user may perform the trigger operation by using a finger. This is not limited in the embodiments of this application.

In some embodiments, as shown in FIG. 3, the terminal may include a user layer, a central processing unit (CPU), and a graphics processing unit (GPU). The user layer may exchange data with the central processing unit. The central processing unit may exchange data with the graphics processing unit. The user layer may be an application layer in an internal software system architecture of the terminal. The trigger location information of the trigger operation in the display interface may be determined by the user layer. The user layer may further transmit the trigger location information to the central processing unit.

The trigger location information may be any information that can indicate a location of the trigger operation. For example, the trigger location information may be coordinates.

In some embodiments, when the user performs the trigger operation on the display interface by using a finger, the finger may cover a plurality of pixels on the display interface. In this case, one pixel may be selected from the plurality of pixels, and location information of the pixel may be used as the trigger location information. Alternatively, location information of the plurality of pixels may be used as the trigger location information.

For example, the user may open a map application on the terminal, so that the display interface displays a page provided by the map application. The page is also configured to display a real-time map. The user may perform a click/tap operation on the display interface. After detecting the click/tap operation, the user layer may obtain at least one pixel covered by the finger when the user performs the click/tap operation, select one pixel from the at least one pixel based on a preset rule, and use location information of the pixel as the trigger location information.

Step 204: Determine, in a process of rendering a second image frame by using a graphics processing unit, each three-dimensional model included in the second image frame, obtain location information of a pixel associated with each three-dimensional model, and match the location information of the pixel associated with each three-dimensional model with the trigger location information, the second image frame being an $N^{th}$ image frame after the first image frame, and N being a positive integer.

The trigger operation may be performed when the display interface displays an $M^{th}$ frame of image, that is, the $M^{th}$ frame of image is the first image frame. Then, the second image frame may be the $N^{th}$ image frame after the $M^{th}$ frame of image. For example, the second image frame may be the first frame of image or the second frame of image after the $M^{th}$ frame of image. This is not limited in the embodiments of this application.

The three-dimensional model may be a three-dimensional image with a length, a width, and a height. For example, the three-dimensional model may be a three-dimensional architectural image of an attraction in the map application. This is not limited in the embodiments of this application.

In some embodiments, when the application is the map application, the central processing unit may find, based on a geographical region range corresponding to the second image frame, a three-dimensional model within the geographical region range, and use the found three-dimensional model as each three-dimensional model included in the second image frame. After determining the three-dimensional model in the second image frame, the central processing unit may send a draw call to the graphics processing unit. The draw call may carry an identifier of the three-dimensional model and the trigger location information. Then, the graphics processing unit renders the corresponding three-dimensional model based on the received draw call.

In the process of rendering each three-dimensional model by using the graphics processing unit, the location information of the pixel associated with each three-dimensional model may be determined, and the location information of the pixel associated with each three-dimensional model may be matched with the trigger location information.

As described above, the trigger location information of the trigger operation in the display interface may be determined by the user layer. The user layer may further transmit the trigger location information to the central processing unit. After determining the three-dimensional model in the second image frame, the central processing unit may send the draw call to the graphics processing unit. The graphics processing unit renders the three-dimensional model based on the received draw call.

When there are a plurality of three-dimensional models determined by the central processing unit, the central processing unit may send the draw call to the graphics processing unit once for each three-dimensional model. That is, the plurality of three-dimensional models are rendered sequentially in the graphics processing unit. A rendering sequence of the plurality of three-dimensional models may be preconfigured or may be randomly determined. This is not limited in the embodiments of this application.

Each three-dimensional model has a corresponding model identifier, and the model identifier is unique, that is, there is a one-to-one correspondence between the three-dimensional model and the model identifier. The model identifier may be a number, a letter, a Chinese character, a character string, or the like. This is not limited in the embodiments of this application.

A pixel in a canvas and a pixel on the display interface are in a one-to-one correspondence. A coordinate system of the pixel on the display interface is different from a coordinate system of the pixel in the canvas. The coordinate system of the pixel on the display interface may be a screen coordinate system. The coordinate system of the pixel in the canvas may be a normalized device coordinate (NDC) system.

In some embodiments, the pixel associated with the three-dimensional model is a pixel covered by the three-dimensional model, and location information, a color value, a depth value, and the like of the pixel that is associated with each three-dimensional model and that is in the canvas may be read from a memory configured to store rendering data.

The draw call may carry the identifier of the three-dimensional model and the trigger location information, so that the graphics processing unit may read, based on the received identifier of the three-dimensional model, various information of the pixel associated with the three-dimensional model from the memory configured to store the rendering data.

In some embodiments, in the process of rendering each three-dimensional model, after the location information of the pixel that is associated with the three-dimensional model and that is in the canvas is obtained, when there are a plurality of pixels associated with the three-dimensional model, the location information of each pixel is converted to the screen coordinate system, and the converted location information is matched with the trigger location information. In the case of successful matching, the pixel is used as a pixel with location information successfully matched.

Step 206: Store, by using the graphics processing unit, a model identifier of a three-dimensional model associated with a pixel with location information successfully matched, to a storage location that corresponds to the successfully matched pixel and that is in a color buffer.

The color buffer is configured to store information. The information includes color information. The color information includes R, G, B, and A. R is a red component value, G is a green component value, B is a blue component value, and A is an alpha transparency value.

In some embodiments, as described above, in the process of rendering each three-dimensional model, the location information of the pixel associated with the three-dimensional model may be read from the memory configured to store the rendering data. When there are a plurality of pixels associated with the three-dimensional model, the location information of each associated pixel is matched with the trigger location information. In the case of successful matching, the pixel is used as a pixel with location information successfully matched, and the model identifier of the three-dimensional model that is currently being rendered is stored to the storage location that corresponds to the pixel and that is in the color buffer. In the case of failed matching, pixel information of the pixel is read from the memory configured to store the rendering data, and the read pixel information is stored to the storage location that corresponds to the pixel and that is in the color buffer.

The following gives descriptions by using an example:

It is assumed that the three-dimensional model in the second image frame includes a model A, a model B, and a model C. It is assumed that a pre-configured rendering sequence of the model A, the model B, and the model C is: model A→model B→model C. First, the model A is rendered. Location information of a pixel that is associated with the model A and that is in a canvas is read from the memory configured to store the rendering data, and the location information of each associated pixel is matched with the trigger location information. In the case of successful matching, the associated pixel is used as a pixel with location information successfully matched, and a model identifier of the model A is stored to the storage location that corresponds to the associated pixel and that is in the color buffer. In the case of failed matching, pixel information of the associated pixel is read from the memory configured to store the rendering data, and the read pixel information is stored to the storage location that corresponds to the associated pixel and that is in the color buffer. Then, the model B is rendered. Finally, the model C is rendered. The processes of rendering the model B and the model C are similar to that of the model A. Details are not described in the embodiments of this application.

Step 208: Read information in the color buffer by using a central processing unit, obtain the model identifier based on the read information, and determine, based on the obtained model identifier, the picked object specified by the trigger operation.

In some embodiments, after the rendering of the three-dimensional model in the second image frame is completed, the central processing unit may read information stored at each storage location in the color buffer. Specifically, the central processing unit may read, using the glReadPixels function, the information stored at each storage location in the color buffer.

In some embodiments, each time reading the information from a storage location, the central processing unit may determine whether the information includes a model identifier. If the information includes the model identifier, the picked object specified by the trigger operation is determined based on the model identifier.

Specifically, as described above, each three-dimensional model has a corresponding model identifier, and the model identifier is unique, that is, there is a one-to-one correspondence between the three-dimensional model and the model identifier. After obtaining the model identifier, the central processing unit may find the three-dimensional model corresponding to the obtained model identifier based on the correspondence between the three-dimensional model and the model identifier, and use the three-dimensional model as the picked object specified by the trigger operation.

In some embodiments, after obtaining the model identifier, the central processing unit may send the model identifier to the user layer. The user layer determines, based on the model identifier, the picked object specified by the trigger operation, obtains a response result corresponding to the picked object, and displays the response result on the display interface, to implement a response to the trigger operation.

In some embodiments, there may be a plurality of pieces of trigger location information, one picked object may be determined based on each piece of trigger location information, and a picked object with the largest quantity may be used as the picked object specified by the trigger operation. For example, assuming that there are five pieces of trigger location information, a picked object determined based on three pieces of trigger location information is a three-dimensional model A, and a picked object determined based on the other two pieces of trigger location information is a three-dimensional model B, the three-dimensional model A is used as the picked object specified by the trigger operation.

In some embodiments, there may be a plurality of pieces of trigger location information, one picked object may be determined based on each piece of trigger location information, and each determined picked object may be used as the picked object specified by the trigger operation. In this case, there may be a plurality of response results, and the plurality of response results may be displayed on the display interface.

According to the method for detecting a picked object provided in this embodiment of this application, trigger location information of a trigger operation is first detected, and the trigger operation is performed by a trigger operator when a display interface displays a first image frame. In a process of rendering a second image frame by using a graphics processing unit, each three-dimensional model included in the second image frame is determined, location information of a pixel associated with each three-dimensional model is obtained, and the location information of the pixel associated with each three-dimensional model is matched with the trigger location information. The matching process of the location information can determine which three-dimensional model the trigger operation is located on. After a pixel with location information successfully matched is found, a model identifier of a three-dimensional model associated with the pixel with the location information successfully matched may be stored by using the graphics processing unit to a storage location that corresponds to the successfully matched pixel and that is in a color buffer. In this case, the model identifier of the three-dimensional model where the trigger operation is located is stored in the color buffer. Finally, information in the color buffer may be read by using a central processing unit, and the model identifier may be obtained based on the read information. Subsequently, a picked object specified by the trigger operation may be determined based on the obtained model identifier to implement an operation response. The entire process described above is an improvement of the existing graphics rendering logic, without the assistance of an additional buffer, so the method can also be applied to a hardware device that does not support reading data from the additional buffer. Therefore, the method for detecting a picked object has high device compatibility.

In some embodiments, the method for detecting a picked object provided in this embodiment of this application further includes: determining each two-dimensional model included in the second image frame; determining, by using the central processing unit, whether location information carried by each two-dimensional model is matched with the trigger location information; and obtaining a model identifier of a two-dimensional model with location information successfully matched, and determining, based on the obtained model identifier of the two-dimensional model, the picked object specified by the trigger operation.

The two-dimensional model may be a two-dimensional image with a length and a width. For example, the two-dimensional model may be a road, a river system, or the like in the map application. This is not limited in the embodiments of this application.

Similar to the three-dimensional model, each two-dimensional model has a corresponding model identifier, and the model identifier is unique, that is, there is a one-to-one correspondence between the two-dimensional model and the model identifier. The model identifier of the two-dimensional model may be a number, a letter, a Chinese character, a character string, or the like. This is not limited in the embodiments of this application.

In some embodiments, when the application is the map application, the central processing unit may find, based on a geographical region range corresponding to the second image frame, a two-dimensional model within the geographical region range, and use the found two-dimensional model as each two-dimensional model included in the second image frame.

In some embodiments, as described above, the trigger location information of the trigger operation in the display interface may be determined by the user layer. The user layer may further transmit the trigger location information to the central processing unit. The central processing unit may also obtain the location information carried by the two-dimensional model in the second image frame. For each two-dimensional model, the central processing unit may determine, based on the location information carried by the two-dimensional model, a region covered by the two-dimensional model, and the central processing unit may determine whether the trigger location information is in the region. If the trigger location information is in the region, it is determined that the two-dimensional model and the trigger location information are successfully matched. If the trigger location information is not in the region, it is determined that the matching of the two-dimensional model and the trigger location information fails. All two-dimensional models are processed in this way to determine the model identifier of the two-dimensional model successfully matched with the trigger location information.

The location information carried by the two-dimensional model includes location information of a pixel associated with the two-dimensional model. The pixel associated with the two-dimensional model is a pixel covered by the two-dimensional model.

Specifically, as described above, each two-dimensional model has a corresponding model identifier, and the model identifier is unique, that is, there is a one-to-one correspondence between the two-dimensional model and the model identifier. After obtaining the model identifier of the two-dimensional model successfully matched with the trigger location information, the central processing unit may find the two-dimensional model corresponding to the obtained model identifier based on the correspondence between the two-dimensional model and the model identifier, and use the two-dimensional model as the picked object specified by the trigger operation.

In some embodiments, after obtaining the model identifier of the two-dimensional model successfully matched with the trigger location information, the central processing unit may send the model identifier to the user layer. The user layer determines, based on the model identifier, the picked object specified by the trigger operation, obtains a response result corresponding to the picked object, and displays the response result on the display interface, to implement a response to the trigger operation.

In some embodiments, the central processing unit may send a draw call of the two-dimensional model to the graphics processing unit. The draw call of the two-dimensional model may carry an identifier of the two-dimensional model, so that the graphics processing unit may read, based on the identifier of the two-dimensional model, various information of the pixel associated with the two-dimensional model from the memory configured to store the rendering data, and may render the two-dimensional model based on the read information.

In some embodiments, after receiving the trigger location information transmitted by the user layer, the central processing unit determines a two-dimensional model and a three-dimensional model in the second image frame. Then, in an aspect, the central processing unit determines whether location information carried by each two-dimensional model is matched with the trigger location information, and obtains a model identifier of a two-dimensional model with location information successfully matched. In another aspect, a draw call of the two-dimensional model and a draw call of the three-dimensional model are sequentially sent to the graphics processing unit. The graphics processing unit first renders the two-dimensional model based on the draw call of the two-dimensional model, renders each three-dimensional model sequentially in the manner of the foregoing embodiments based on the draw call of the three-dimensional model after completing the rendering of the two-dimensional model, and obtains a model identifier of the three-dimensional model. If the central processing unit can obtain the model identifier of the three-dimensional model, the model identifier of the three-dimensional model is transmitted to the user layer. If the central processing unit does not obtain the model identifier of the three-dimensional model, the model identifier of the two-dimensional model obtained above is transmitted to the user layer. The user layer determines, based on the received model identifier, the picked object specified by the trigger operation, obtains a response result corresponding to the picked object, and displays the response result on the display interface, to implement a response to the trigger operation.

The foregoing embodiment in which the two-dimensional model picking detection and the three-dimensional model picking detection are performed in parallel is only an example. It is also possible that the central processing unit no longer performs the three-dimensional model picking detection after obtaining the model identifier of the two-dimensional model with the location information successfully matched, and only completes the rendering of the two-dimensional model and the three-dimensional model according to a normal rendering process. In this case, the obtained model identifier of the two-dimensional model is directly returned to the user layer. It is also possible that the two-dimensional model picking detection and the three-dimensional model picking detection are performed in parallel, but the central processing unit first determines whether the model identifier of the two-dimensional model is obtained after the rendering is completed. If the model identifier of the two-dimensional model is obtained, the model identifier of the two-dimensional model is returned to the user layer. If the model identifier of the two-dimensional model is not obtained, whether the model identifier of the three-dimensional model is obtained is further determined. If the model identifier of the three-dimensional model is obtained, the model identifier of the three-dimensional model is returned to the user layer.

In the foregoing embodiments, the second image frame includes not only the three-dimensional model but also the two-dimensional model. In this case, the central processing unit determines whether the location information carried by each two-dimensional model is matched with the trigger location information, obtains the model identifier of the two-dimensional model with the location information successfully matched, and determines, based on the obtained model identifier of the two-dimensional model, the picked object specified by the trigger operation to implement an operation response. Then, when the trigger operation of the user is performed on the two-dimensional model, the two-dimensional model on which the trigger operation is performed can also be detected, to implement a response to the trigger operation for the two-dimensional model.

In some embodiments, the method for detecting a picked object provided in this embodiment of this application further includes: storing, by using the graphics processing unit, when location information of a pixel associated with any three-dimensional model is not successfully matched with the trigger location information, pixel information corresponding to the pixel that is associated with the three-dimensional model and that is not successfully matched, to the color buffer. Information stored in the color buffer is for implementing the rendered display of the second image frame.

After determining each three-dimensional model included in the second image frame, the central processing unit sends a draw call to the graphics processing unit. The draw call may carry the trigger location information and the model identifier of the three-dimensional model. The graphics processing unit may read, based on the received model identifier, the location information of the pixel associated with the three-dimensional model from the memory configured to store the rendering data, and match the trigger location information with the location information of each associated pixel. In the case of successful matching, the model identifier of the three-dimensional model is stored to the storage location that corresponds to the successfully matched pixel and that is in the color buffer. In the case of failed matching, the pixel information corresponding to the pixel that is not successfully matched is read from the memory configured to store the rendering data, and is stored to the storage location that corresponds to the unsuccessfully matched pixel and that is in the color buffer. When there are a plurality of three-dimensional models, each three-dimensional model is processed as above in the rendering process.

The following gives descriptions by using an example:

It is assumed that the three-dimensional model in the second image frame includes a model A, a model B, and a model C. It is assumed that a rendering sequence of the model A, the model B, and the model C is: model A→model B→model C. As shown in FIG. 4, it is assumed that, in a canvas, pixels associated with the model A include: t0 and t1; pixels associated with the model B include: t6, t7, t10, and t11; and pixels associated with the model C include: t12 and t13. First, the model A is rendered. When t0 is processed, location information of t0 is matched with the trigger location information. In the case of successful matching, a model identifier of the model A is stored to a storage location that corresponds to t0 and that is in a color buffer. In the case of failed matching, pixel information corresponding to t0 is obtained, and the pixel information corresponding to t0 is stored to the storage location that corresponds to t0 and that is in the color buffer. Based on this, the similar operations are performed to process t1. Then, the model B is rendered. The operations similar to those of t0 are performed to process t6, t7, t10, and t11. Finally, the model C is rendered. The operations similar to those of t0 are performed to process t12 and t13. For example, assuming that location information of t6 is successfully matched with the trigger location information, an obtained color buffer is shown in FIG. 5.

In the process of rendering each three-dimensional model, as there may be a plurality of pixels associated with the three-dimensional model, a sequence for processing the plurality of pixels may be pre-configured or may be randomly specified. This is not limited in the embodiments of this application.

The operations when the location information of the pixel associated with the three-dimensional model is not successfully matched with the trigger location information are described in the foregoing embodiments. Specifically, when location information of a pixel associated with any three-dimensional model is not successfully matched with the trigger location information, pixel information corresponding to the pixel that is associated with the three-dimensional model and that is not successfully matched is stored to the color buffer by using the graphics processing unit. In this case, information stored at the storage location corresponding to the successfully matched pixel is different from information stored at the storage location corresponding to the unsuccessfully matched pixel. Subsequently, the central processing unit may read the model identifier stored at the storage location corresponding to the successfully matched pixel, and determine the picked object based on the read model identifier.

In some embodiments, the method for detecting a picked object provided in this embodiment of this application further includes: obtaining, after the trigger operation ends, pixel information of a pixel associated with each model in a third image frame, the third image frame being a next image frame of the second image frame; and refreshing, based on the pixel information of the pixel associated with each model in the third image frame, the information stored in the color buffer, to render the third image frame to the display interface for display, the model including at least one of a three-dimensional model or a two-dimensional model.

In some embodiments, the information in the color buffer may be read by using the central processing unit, the model identifier may be obtained based on the read information, each model included in the next image frame of the second image frame may be determined after the model identifier is obtained, pixel information of a pixel associated with each model may be obtained, and the color buffer may be refreshed based on the obtained pixel information. For ease of description, in this embodiment of this application, the next image frame of the second image frame is referred to as the third image frame.

In some embodiments, the central processing unit may determine the two-dimensional model and the three-dimensional model in the third image frame, and send a draw call of the two-dimensional model and a draw call of the three-dimensional model sequentially to the graphics processing unit. The graphics processing unit first reads, based on the draw call of the two-dimensional model, location information and pixel information of the pixel associated with the two-dimensional model from the memory configured to store the rendering data, and renders the two-dimensional model based on the read information to refresh the pixel information that is related to the two-dimensional model and that is stored in the color buffer. After the rendering of the two-dimensional model is completed, location information and pixel information of the pixel associated with the three-dimensional model is read, based on the draw call of the three-dimensional model, from the memory configured to store the rendering data, and the three-dimensional model is rendered based on the read information to refresh the pixel information that is related to the three-dimensional model and that is stored in the color buffer. In this case, the refreshed color buffer is obtained to render the third image frame to the display interface for display.

The foregoing embodiment describes a case in which the third image frame includes both the two-dimensional model and the three-dimensional model. The third image frame may include only the two-dimensional model. In this case, the graphics processing unit only needs to render the corresponding two-dimensional model. Similarly, the third image frame may include only the three-dimensional model. In this case, the graphics processing unit only needs to render the corresponding three-dimensional model. Details are not described in the embodiments of this application.

In some embodiments, a display device may read the pixel information at each storage location in the refreshed color buffer, and display a corresponding color at a corresponding location of the display interface based on the read pixel information, to render the third image frame to the display interface for display.

For example, as shown in FIG. 5, since the storage location corresponding to t6 does not store the pixel information corresponding to t6, but instead stores the model identifier, the corresponding pixel on the display interface is abnormal. In this case, the display of the second image frame is skipped, and the third image frame is instead rendered to the display interface for display, which reduces the possibility of abnormal display of the display interface.

In the foregoing embodiments, as the model identifier is stored at the storage location that corresponds to the pixel with the location information successfully matched and that is in the color buffer when the second image frame is rendered, leading to an abnormality of the corresponding pixel on the display interface, the information stored in the color buffer is refreshed based on the pixel information of the pixel, in the canvas, associated with each model in the third image frame, to render the third image frame to the display interface for display, which reduces the possibility of abnormal display of the display interface.

In some embodiments, the method for detecting a picked object provided in this embodiment of this application further includes: transmitting the trigger location information to the graphics processing unit by using the central processing unit; and storing the trigger location information to a uniform variable of a shader corresponding to a draw call by using the graphics processing unit. The matching the location information of the pixel associated with each three-dimensional model with the trigger location information includes: obtaining the trigger location information from the uniform variable by using the graphics processing unit, and matching the location information of the pixel associated with each three-dimensional model with the trigger location information.

In some embodiments, the trigger location information of the trigger operation in the display interface may be determined by the user layer. The user layer may further transmit the trigger location information to the central processing unit. After determining the three-dimensional model in the second image frame, the central processing unit sends a draw call of the three-dimensional model to the graphics processing unit. The draw call of the three-dimensional model may carry the trigger location information and an identifier of the three-dimensional model. The graphics processing unit determines the shader corresponding to the draw call of the three-dimensional model, and stores the trigger location information to the uniform variable of the shader.

In some embodiments, after receiving the draw call of the three-dimensional model, the graphics processing unit may find a shader in an idle state from all shaders, use the found shader as the shader corresponding to the draw call of the three-dimensional model, and store the trigger location information to the uniform variable of the shader.

When there are a plurality of three-dimensional models, the central processing unit may deliver corresponding draw calls for the plurality of three-dimensional models sequentially to the graphics processing unit, and the graphics processing unit may store the trigger location information to the uniform variable of the shader corresponding to each draw call.

In some embodiments, as the trigger location information is stored in the uniform variable of the shader, in the process of rendering each three-dimensional model by using the graphics processing unit, the trigger location information may be obtained from the uniform variable, and the location information of the pixel associated with each three-dimensional model may be matched with the read trigger location information.

In some embodiments, coordinates of the pixel in the canvas are on a normalized device coordinate system, and coordinates of the pixel on the display interface are on a screen coordinate system. The trigger location information may be converted to the normalized device coordinate system to obtain converted location information. The location information of the pixel associated with the three-dimensional model may be compared with the converted location information. If the location information of the pixel associated with the three-dimensional model and the converted location information are consistent, it is determined that the location information of the pixel associated with the three-dimensional model is successfully matched with the trigger location information. If the location information of the pixel associated with the three-dimensional model and the converted location information are not consistent, it is determined that the location information of the pixel associated with the three-dimensional model is not successfully matched with the trigger location information.

In the foregoing embodiment, the trigger location information is sent to the graphics processing unit by using the central processing unit; and the trigger location information is stored to the uniform variable of the shader corresponding to the draw call by using the graphics processing unit. In this case, when the three-dimensional model is rendered, the trigger location information is obtained from the uniform variable by using the graphics processing unit, and the location information of the pixel associated with each three-dimensional model is matched with the trigger location information. The method utilizes the uniform variable of the shader, without the assistance of an additional buffer, so the method can also be applied to a hardware device that does not support reading data from the additional buffer. Therefore, the detection method has high device compatibility.

In some embodiments, the storing, by using the graphics processing unit, a model identifier of a three-dimensional model associated with a pixel with location information successfully matched, to a storage location that corresponds to the successfully matched pixel and that is in a color buffer includes: obtaining the pixel with the location information successfully matched; querying, when information has been stored at the storage location that corresponds to the successfully matched pixel and that is in the color buffer, a first depth value that is associated with the stored information and that is in a depth buffer; obtaining a second depth value corresponding to the successfully matched pixel; and storing, by using the graphics processing unit, when the second depth value is less than the first depth value, the model identifier of the three-dimensional model associated with the pixel with the location information successfully matched, to the storage location that corresponds to the successfully matched pixel and that is in the color buffer.

The depth buffer is configured to store a depth value of a pixel associated with each two-dimensional model and a depth value of a pixel associated with each three-dimensional model. The depth value is for indicating a distance between a corresponding pixel and a view angle.

After determining the three-dimensional model in the second image frame, the central processing unit may send a draw call of the three-dimensional model to the graphics processing unit. The draw call of the three-dimensional model may carry the trigger location information and an identifier of the three-dimensional model. The graphics processing unit may read, based on the identifier of the three-dimensional model, the location information of the pixel associated with the three-dimensional model from the memory configured to store the rendering data, and match the trigger location information with the location information of each associated pixel. In the case of successful matching, the associated pixel is used as the pixel with the location information successfully matched.

In some embodiments, after the pixel with the location information successfully matched is obtained, the storage location corresponding to the pixel is found in the color buffer, and whether information has been stored at the storage location is checked. If the information has been stored, it is determined that there is coverage between corresponding pixels on the display interface of a currently rendered model and a model that has been rendered. In this case, in the depth buffer, the first depth value associated with the stored information is queried, the second depth value corresponding to the successfully matched pixel is obtained, and the first depth value is compared with the second depth value. If the information has not been stored, the model identifier of the three-dimensional model associated with the pixel with the location information successfully matched is directly stored by using the graphics processing unit to the storage location that corresponds to the successfully matched pixel and that is in the color buffer.

Specifically, when the second depth value is less than the first depth value, indicating that the currently rendered model on the display interface covers the model that has been rendered, the model identifier of the three-dimensional model associated with the pixel with the location information successfully matched is stored by using the graphics processing unit to the storage location that corresponds to the successfully matched pixel and that is in the color buffer. When the second depth value is greater than the first depth value, indicating that the model that has been rendered on the display interface covers the currently rendered model, the information stored at the storage location that corresponds to the successfully matched pixel and that is in the color buffer is kept unchanged.

When the location information of the pixel associated with the three-dimensional model is not successfully matched with the trigger location information, whether information has been stored at the storage location that corresponds to the associated pixel and that is in the color buffer may also be checked. When the information has been stored, the comparison between depth values may also be performed to determine whether to update the pixel information at the storage location.

In the foregoing embodiment, when information has been stored at the storage location that corresponds to the successfully matched pixel and that is in the color buffer, a first depth value that is associated with the stored information and that is in a depth buffer is queried; a second depth value corresponding to the successfully matched pixel is obtained; and when the second depth value is less than the first depth value, the model identifier of the three-dimensional model associated with the pixel with the location information successfully matched is stored by using the graphics processing unit to the storage location that corresponds to the successfully matched pixel and that is in the color buffer. Subsequently, the central processing unit may read the model identifier stored at the storage location corresponding to the successfully matched pixel, and determine the picked object based on the read model identifier. The whole process does not involve the assistance of an additional buffer, so the method can also be applied to a hardware device that does not support reading data from the additional buffer. Therefore, the detection method has high device compatibility.

In some embodiments, the storing, by using the graphics processing unit, a model identifier of a three-dimensional model associated with a pixel with location information successfully matched, to a storage location that corresponds to the successfully matched pixel and that is in a color buffer further includes: keeping, when the second depth value is greater than the first depth value, the information stored at the storage location that corresponds to the successfully matched pixel and that is in the color buffer unchanged.

When the second depth value is greater than the first depth value, indicating that the model that has been rendered on the display interface covers the currently rendered model, the information stored at the storage location that corresponds to the successfully matched pixel and that is in the color buffer is kept unchanged.

The following gives descriptions by using an example:

It is assumed that the three-dimensional model in the second image frame includes a model A, a model B, and a model C. It is assumed that a rendering sequence of the model A, the model B, and the model C is: model A→model B→model C. As shown in FIG. 6, it is assumed that, in a canvas, pixels associated with the model A include: t0, t1, t4, and t5; pixels associated with the model B include: t5, t6, t9, and t10; and pixels associated with the model C include: t14 and t15. It is assumed that location information of t5 is successfully matched with the trigger location information. First, the model A is rendered. When t0 is processed, location information of t0 is matched with the trigger location information. Since the location information of t0 is not successfully matched with the trigger location information, pixel information corresponding to t0 is stored to a storage location that corresponds to t0 and that is in a color buffer. The pixels t1, t4, and t5 are continuously processed by using the same method. Then, the model B is rendered. When t5 is processed, location information of t5 is matched with the trigger location information. Since the location information of t5 is successfully matched with the trigger location information, a storage location corresponding to t5 is found in the color buffer, and whether information has been stored at the storage location is checked. As pixel information has been stored at the storage location that corresponds to t5 and that is in the color buffer when the model A is rendered, in a depth buffer, a first depth value associated with the stored information is queried, a second depth value corresponding to the model B at t5 is obtained, and the first depth value is compared with the second depth value. When the second depth value is less than the first depth value, a model identifier of the model B is stored to the storage location that corresponds to t5 and that is in the color buffer. When the second depth value is greater than the first depth value, the information stored at the storage location that corresponds to t5 and that is in the color buffer is kept unchanged. For example, the depth buffer may be shown in FIG. 7. The pixels t6, t9, and t10 are processed by using the method similar to that when the model A is rendered. Finally, the model C is rendered. The pixels t14 and t15 are processed by using the method similar to that when the model A is rendered. Details are not described in the embodiments of this application.

In the foregoing embodiment, when information has been stored at the storage location that corresponds to the successfully matched pixel and that is in the color buffer, a first depth value that is associated with the stored information and that is in a depth buffer is queried; a second depth value corresponding to the successfully matched pixel is obtained; and when the second depth value is greater than the first depth value, the information stored at the storage location that corresponds to the successfully matched pixel and that is in the color buffer is kept unchanged. In this case, when there is coverage between three-dimensional models, the user always sees the closest three-dimensional model, which increases the display accuracy.

In some embodiments, the storing, by using the graphics processing unit, a model identifier of a three-dimensional model associated with a pixel with location information successfully matched, to a storage location that corresponds to the successfully matched pixel and that is in a color buffer includes: obtaining, by using the graphics processing unit, the model identifier of the three-dimensional model associated with the pixel with the location information successfully matched, and performing a bitwise operation on the model identifier of the three-dimensional model to obtain an identifier bitwise operation result; splitting the identifier bitwise operation result into a first endian and a second endian; and storing the first endian to a red component at the storage location that corresponds to the successfully matched pixel and that is in the color buffer, storing the second endian to a green component at the storage location, and storing a preset check value to a blue component at the storage location.

In some embodiments, after determining the three-dimensional model in the second image frame, the central processing unit may send a draw call to the graphics processing unit. The draw call may carry the model identifier of the corresponding three-dimensional model and the trigger location information. The graphics processing unit receives the draw call and starts to render the corresponding three-dimensional model. In the rendering process, if the pixel with the location information successfully matched can be obtained, the model identifier carried by the draw call may be used as a model identifier to be stored in the color buffer.

In some embodiments, the model identifier may be converted to binary to obtain a binary conversion result, and the binary conversion result may be used as the identifier bitwise operation result.

The first endian may be a big endian, and the second endian may be a little endian.

In some embodiments, when the first endian is a big endian and the second endian is a little endian, the big endian may be stored to the red component at the storage location that corresponds to the successfully matched pixel and that is in the color buffer, the little endian may be stored to the green component, and the preset check value may be stored to the blue component.

For example, as shown in FIG. 8, the big endian may be stored to the R component, the little endian may be stored to the G component, and the preset check value may be stored to the B component. A is configured to store an alpha transparency value. To prevent background color mixing interference, the alpha transparency value may be set to 1. To prevent background color interference, the alpha transparency value may be set to 0xFF.

In some embodiments, an R value, a G value, and a B value of a preset color value may be further stored in a corresponding color component. The preset color value may be white or may be black. This is not limited in the embodiments of this application.

In the foregoing embodiment, the model identifier of the three-dimensional model associated with the pixel with the location information successfully matched is obtained by using the graphics processing unit, and a bitwise operation is performed on the model identifier of the three-dimensional model to obtain an identifier bitwise operation result; the identifier bitwise operation result is split into a first endian and a second endian; and the first endian is stored to a red component at the storage location that corresponds to the successfully matched pixel and that is in the color buffer, the second endian is stored to a green component at the storage location, and a preset check value is stored to a blue component at the storage location. This storage manner increases a quantity of model identifiers that can be stored. In addition, the writing of the preset check value and a subsequent check provide higher accuracy of the finally determined picked object.

In some embodiments, the obtaining the model identifier based on the read information includes: obtaining the check value from the read blue component; performing a check on the check value, and obtaining, when the check succeeds, the first endian from the read red component, and obtaining the second endian from the read green component; determining the identifier bitwise operation result based on the first endian and the second endian; and converting the identifier bitwise operation result to obtain the model identifier.

The first endian may be a big endian, and the second endian may be a little endian.

In some embodiments, the central processing unit may read information stored at each storage location in the color buffer one by one. When the read information includes the red component, the green component, and the blue component, the central processing unit may first perform a check on the blue component to determine whether a value of the blue component is the preset check value. If the value of the blue component is the preset check value, it is determined that the model identifier of the three-dimensional model on which the trigger operation is performed is stored at the corresponding storage location. Then, the big endian is obtained from the red component, the little endian is obtained from the green component, and the big endian and the little endian are combined, to obtain the identifier bitwise operation result.

In some embodiments, at the stage of storing the model identifier, if the model identifier is converted to binary, and the binary conversion result is used as the identifier bitwise operation result, after the identifier bitwise operation result is obtained through the foregoing process, an inverse operation of the foregoing conversion process may be performed to obtain the model identifier of the three-dimensional model.

In the foregoing embodiment, after the rendering process ends, the central processing unit may read pixel information at each storage location in the color buffer one by one. If the check on the value of the blue component at a storage location succeeds, it is determined that the model identifier of the three-dimensional model on which the trigger operation is performed is stored at the corresponding storage location. Then, the model identifier is further obtained from the red component and the green component. The entire process described above is an improvement of the existing graphics rendering logic, without the assistance of an additional buffer, so the method can also be applied to a hardware device that does not support reading data from the additional buffer. Therefore, device compatibility is high.

In some embodiments, the method for detecting a picked object provided in this embodiment of this application further includes: obtaining a pre-configured correspondence between an object and a response result; finding a target response result corresponding to the picked object from the correspondence; and displaying the target response result on the display interface.

In some embodiments, a response result to be displayed on the display interface may be pre-configured when each three-dimensional model is triggered, and a response result to be displayed on the display interface may be pre-configured when each two-dimensional model is triggered. A correspondence between the three-dimensional model and the response result and a correspondence between the two-dimensional model and the response result may be established.

In some embodiments, after the picked object specified by the trigger operation is determined through the foregoing embodiments, the response result corresponding to the picked object is found from the correspondence, the found response result is used as the target response result, and the target response result is displayed on the display interface.

The target response result may be superimposed on the third image frame for display, or the target response result is first displayed and the third image frame is then displayed, or the third image frame is first displayed and the target response result is then displayed. This is not limited in the embodiments of this application.

In the foregoing embodiment, the correspondence between the three-dimensional model and the response result and the correspondence between the two-dimensional model and the response result are pre-configured. After the picked object specified by the trigger operation is determined, the target response result corresponding to the picked object may be found based on the correspondence, and the target response result may be displayed on the display interface, to implement an interface response to the trigger operation.

In some embodiments, the trigger operation is a click/tap operation, and the detecting trigger location information of a trigger operation includes: obtaining a pixel covered by the click/tap operation on the display interface; determining a coverage region of the click/tap operation on the display interface based on the pixel covered by the click/tap operation on the display interface; and determining a target location point in the coverage region, and using location information of the target location point in the display interface as the trigger location information.

The user may perform the click/tap operation by using any body part that can be recognized by the terminal. For example, the user may perform the click/tap operation by using a finger. When the user performs the trigger operation on the display interface by using the finger, the finger may cover a plurality of pixels on the display interface. The pixel covered by the click/tap operation on the display interface may be obtained, and the coverage region of the click/tap operation on the display interface may be determined based on the pixel covered by the click/tap operation on the display interface. The target location point is determined in the coverage region, and the location information of the target location point in the display interface is used as the trigger location information.

In some embodiments, after the pixels covered by the click/tap operation on the display interface are obtained, edge pixels may be determined from these pixels, and a region enclosed by a line connecting the edge pixels is used as the coverage region of the click/tap operation on the display interface.

In some embodiments, after the coverage region of the click/tap operation on the display interface is determined, a pixel closest to a center location of the coverage region is found from the pixels covered by the finger, the pixel is used as the target location point, and the location information of the target location point in the display interface is used as the trigger location information.

In the foregoing embodiments, as there may be many pixels touched by the finger when performing the click/tap operation on the display interface, the coverage region of the click/tap operation on a display region is determined based on these pixels, the target location point is determined from the coverage region, and the location information of the target location point in the display interface is used as trigger location information. The trigger location information determined in this way is closer to a location that the user wants to trigger, which increases the efficiency of obtaining the trigger location information.

In some embodiments, a method for detecting a picked object is provided. The method includes the following steps:

When a trigger operation is a click/tap operation, a pixel covered by the click/tap operation on a display interface is obtained; a coverage region of the click/tap operation on the display interface is determined based on the pixel covered by the click/tap operation on the display interface; and a target location point is determined in the coverage region, and location information of the target location point in the display interface is used as the trigger location information.

After the trigger location information is determined, in an aspect, three-dimensional model picking detection may be performed specifically as follows:

The trigger location information is transmitted to the graphics processing unit by using the central processing unit; the trigger location information is stored to a uniform variable of a shader corresponding to a draw call by using the graphics processing unit; and in a process of rendering a second image frame by using the graphics processing unit, each three-dimensional model included in the second image frame is determined, location information of a pixel associated with each three-dimensional model is obtained, the trigger location information is obtained from the uniform variable by using the graphics processing unit, and the location information of the pixel associated with each three-dimensional model is matched with the trigger location information.

The pixel with the location information successfully matched is obtained; when information has been stored at the storage location that corresponds to the successfully matched pixel and that is in the color buffer, a first depth value that is associated with the stored information and that is in a depth buffer is queried; and a second depth value corresponding to the successfully matched pixel is obtained. When the second depth value is less than the first depth value, a model identifier of a three-dimensional model associated with the pixel with the location information successfully matched is obtained by using the graphics processing unit, and a bitwise operation is performed on the model identifier of the three-dimensional model to obtain an identifier bitwise operation result; the identifier bitwise operation result is split into a first endian and a second endian; and the first endian is stored to a red component at the storage location that corresponds to the successfully matched pixel and that is in the color buffer, the second endian is stored to a green component at the storage location, and a preset check value is stored to a blue component at the storage location. When the second depth value is greater than the first depth value, the information stored at the storage location that corresponds to the successfully matched pixel and that is in the color buffer is kept unchanged. When location information of a pixel associated with any three-dimensional model is not successfully matched with the trigger location information, pixel information corresponding to the unsuccessfully matched pixel is stored to the color buffer by using the graphics processing unit.

Information in the color buffer is read by using the central processing unit, and the check value is obtained from the read blue component; a check is performed on the check value, and when the check succeeds, the first endian is obtained from the read red component, and the second endian is obtained from the read green component; the identifier bitwise operation result is determined based on the first endian and the second endian; and the identifier bitwise operation result is converted to obtain the model identifier.

A picked object specified by the trigger operation is determined based on the obtained model identifier, and a pre-configured correspondence between an object and a response result is obtained; a target response result corresponding to the picked object is found from the correspondence; and the target response result is displayed on the display interface.

After the trigger operation ends, pixel information of a pixel associated with each model in a third image frame is obtained, the third image frame being a next image frame of the second image frame; and the information stored in the color buffer is refreshed based on the pixel information of the pixel associated with each model in the third image frame, to render the third image frame to the display interface for display, the model including at least one of a three-dimensional model or a two-dimensional model.

In another aspect, two-dimensional model picking detection may be performed specifically as follows:

Each two-dimensional model included in the second image frame is determined; whether location information carried by each two-dimensional model is matched with the trigger location information is determined by using the central processing unit; and a model identifier of a two-dimensional model with location information successfully matched is obtained, and a picked object specified by the trigger operation is determined based on the obtained model identifier of the two-dimensional model, to implement an operation response.

According to the method for detecting a picked object provided in this embodiment of this application, trigger location information of a trigger operation is first detected, and the trigger operation is performed by a trigger operator when a display interface displays a first image frame. In a process of rendering a second image frame by using a graphics processing unit, each three-dimensional model included in the second image frame is determined, location information of a pixel associated with each three-dimensional model is obtained, and the location information of the pixel associated with each three-dimensional model is matched with the trigger location information. The matching process of the location information can determine which three-dimensional model the trigger operation is located on. After a pixel with location information successfully matched is found, a model identifier of a three-dimensional model associated with the pixel with the location information successfully matched may be stored by using the graphics processing unit to a storage location that corresponds to the successfully matched pixel and that is in a color buffer. In this case, the model identifier of the three-dimensional model where the trigger operation is located is stored in the color buffer. Finally, information in the color buffer may be read by using a central processing unit, and the model identifier may be obtained based on the read information. Subsequently, a picked object specified by the trigger operation may be determined based on the obtained model identifier to implement an operation response. The entire process described above is an improvement of the existing graphics rendering logic, without the assistance of an additional buffer, so the method can also be applied to a hardware device that does not support reading data from the additional buffer. Therefore, the method for detecting a picked object has high device compatibility.

Figure 9:
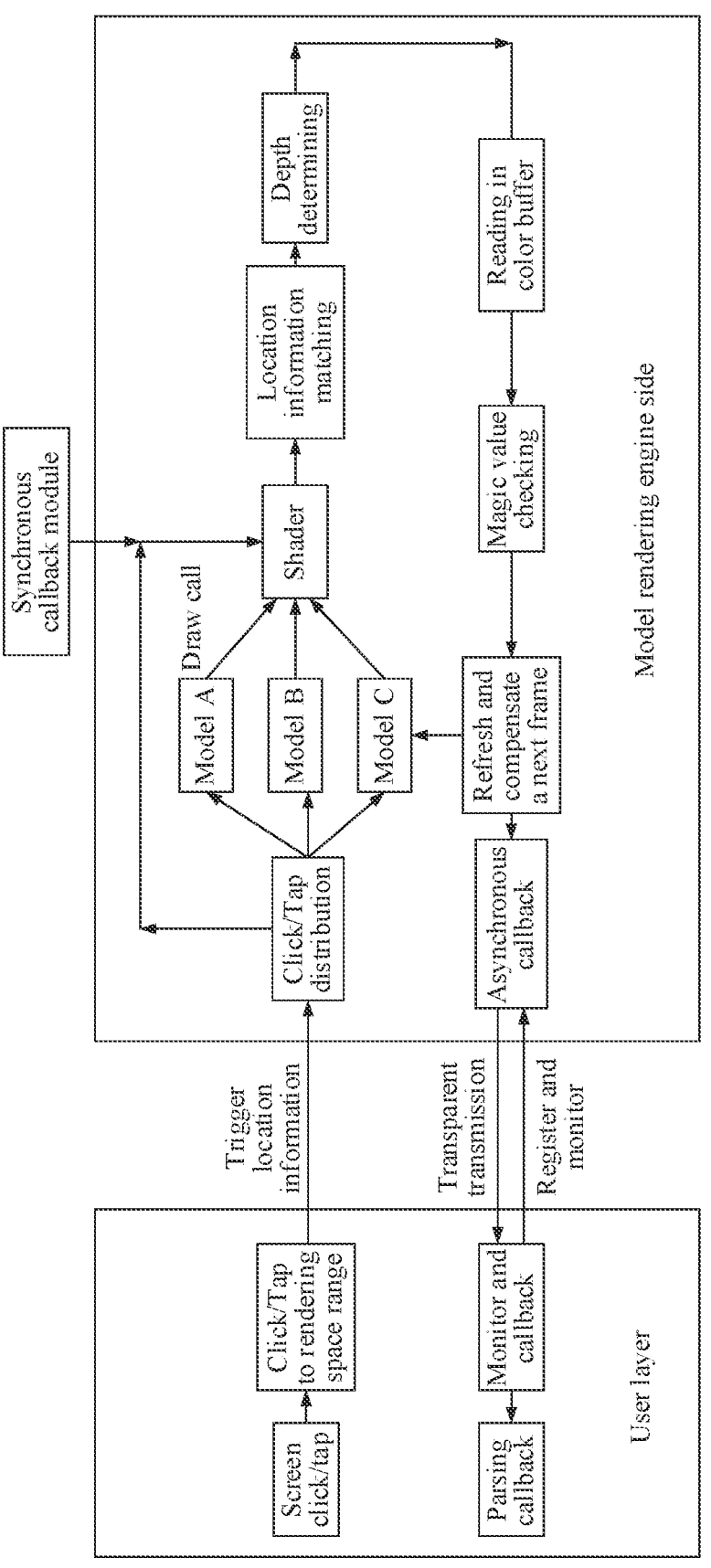
FIG. 9 is a schematic flowchart of a method for detecting a picked object according to another embodiment.

In a possible scenario, involved in the embodiments of this application, the application is a map application, and the trigger operation is a click/tap operation. As shown in FIG. 9, after opening a map application, a user performs a click/tap operation on a display interface, that is, a screen click/tap in FIG. 9. A user layer determines trigger location information of the click/tap operation. When the trigger location information indicates a click/tap to a rendering space range, the user layer transmits the trigger location information to a model rendering engine side. The model rendering engine side performs click/tap distribution by using a central processing unit. In an aspect, the trigger location information is transmitted to a synchronous callback module of the central processing unit. The synchronous callback module first determines a two-dimensional model in a second image frame and then determines whether location information carried by each two-dimensional model is matched with the trigger location information. If the location information carried by each two-dimensional model is successfully matched with the trigger location information, a model identifier of a two-dimensional model with location information successfully matched is obtained, and the model identifier of the two-dimensional model is used as a synchronous callback result. In another aspect, a three-dimensional model in the second image frame is determined by using the central processing unit. As shown in FIG. 9, assuming that the determined three-dimensional model includes a model A, a model B, and a model C, for each three-dimensional model, a draw call is sent to a shader in a graphics processing unit by using the central processing unit. The draw call may carry the model identifier and the trigger location information. After receiving the draw call, in a process of rendering the corresponding three-dimensional model, the shader determines location information of a pixel that is associated with the three-dimensional model and that is in a canvas, matches the location information of the pixel associated with the three-dimensional model with the trigger location information, and obtains a pixel with location information successfully matched. When information has been stored at the storage location that corresponds to the successfully matched pixel and that is in the color buffer, a first depth value that is associated with the stored information and that is in a depth buffer is queried; a second depth value corresponding to the successfully matched pixel is obtained; and when the second depth value is less than the first depth value, the model identifier of the three-dimensional model associated with the pixel with the location information successfully matched is stored by using the graphics processing unit to the storage location that corresponds to the successfully matched pixel and that is in the color buffer. When location information of a pixel associated with any three-dimensional model is not successfully matched with the trigger location information, pixel information corresponding to the unsuccessfully matched pixel is stored to the color buffer by using the graphics processing unit. After the rendering of the model A, the model B, and the model C is completed sequentially, information in the color buffer is read by using the central processing unit, a check value is obtained from a read blue component, a check is performed on a magic value (preset check value), and when the check succeeds, the model identifier is obtained from a read red component and a read green component. Based on obtaining the model identifier, a next frame is refreshed and compensated, that is, a third image frame after the second image frame is obtained. The information stored in the color buffer is refreshed based on pixel information of a pixel, in the canvas, associated with each model in the third image frame, to render the third image frame to the display interface for display, and the obtained model identifier is used as an asynchronous callback result. When the asynchronous callback result can be obtained, the asynchronous callback result may be returned to a trigger object callback module of the user layer by using the central processing unit. When the asynchronous callback result is not obtained, the synchronous callback result may be returned to the trigger object callback module of the user layer by using the central processing unit. The trigger object callback module of the user layer may register a callback of a trigger object to the model rendering engine side in advance, so that after obtaining a callback result, the model rendering engine side returns the callback result to the registered trigger object callback module. A parsing callback module of the user layer may obtain the model identifier from the trigger object callback module, and determine a response result of the display interface based on the obtained model identifier.

In a possible scenario, involved in the embodiments of this application, the application is a game application, and the trigger operation is a click/tap operation. After opening a game application, a user may perform a click/tap operation on any image frame displayed in the game application. A user layer may determine trigger location information of the click/tap operation and determine each three-dimensional game model in a next image frame to be displayed. The three-dimensional game model includes a game character, a scene element in a game scene, and the like. The scene element includes an obstacle, a tree, a road, and the like. In a process of rendering each three-dimensional game model by using a graphics processing unit, location information of a pixel, in a canvas, associated with each three-dimensional game model may be obtained, the location information of the pixel associated with each three-dimensional game model may be matched with the trigger location information to obtain a successfully matched pixel, a model identifier of a three-dimensional game model associated with the successfully matched pixel may be obtained, and the model identifier may be stored by using the graphics processing unit to a storage location that corresponds to the successfully matched pixel and that is in a color buffer. Information in the color buffer may be read by using a central processing unit, the model identifier may be obtained from the read information, a picked object specified by the trigger operation may be determined based on the obtained model identifier, and finally a response may be made to the trigger operation based on the determined picked object.

It is to be understood that, although the steps are displayed sequentially according to the instructions of the arrows in the flowcharts of the embodiments, these steps are not necessarily performed sequentially according to the sequence instructed by the arrows. Unless otherwise explicitly specified in this application, implementation of these steps is not strictly limited, and these steps may be implemented in other sequences. Moreover, at least some of the steps in the flowchart involved in each embodiment may include a plurality of steps or a plurality of stages. These steps or stages are not necessarily performed at the same moment but may be performed at different moments. These steps or stages are not necessarily sequentially performed, but may be performed alternately with other steps or at least some of steps or stages of other steps.

Based on the same inventive concept, an embodiment of this application further provides an apparatus for detecting a picked object for implementing the method for detecting a picked object. Implementation solutions for resolving the problem provided by the apparatus are similar to the implementation solutions recorded in the foregoing method. Therefore, for specific limitations in one or more embodiments of the apparatus for detecting a picked object provided below, refer to the limitations on the method for detecting a picked object above. Details are not described herein.

Figure 10:
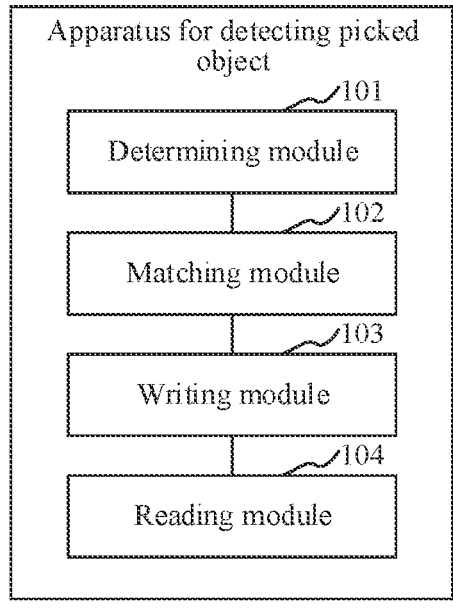
FIG. 10 is a block diagram of a structure of an apparatus for detecting a picked object according to an embodiment.

In some embodiments, as shown in FIG. 10, an apparatus for detecting a picked object is provided, including:

a determining module 101, configured to detect trigger location information of a trigger operation, the trigger operation being performed by a trigger operator when a display interface displays a first image frame, an image frame displayed by the display interface being updated at a preset frequency, and the first image frame being any image frame in an updating process;

the determining module 101 being further configured to determine, in a process of rendering a second image frame by using a graphics processing unit, each three-dimensional model included in the second image frame;

a matching module 102, configured to obtain location information of a pixel associated with each three-dimensional model, and match the location information of the pixel associated with each three-dimensional model with the trigger location information, the second image frame being an $N^{th}$ image frame after the first image frame, and N being a positive integer;

a writing module 103, configured to store, by using the graphics processing unit, a model identifier of a three-dimensional model associated with a pixel with location information successfully matched, to a storage location that corresponds to the successfully matched pixel and that is in a color buffer; and a reading module 104, configured to read information in the color buffer by using a central processing unit, obtain the model identifier based on the read information, and determine, based on the obtained model identifier, the picked object specified by the trigger operation.

In some embodiments, the apparatus for detecting a picked object further includes: a two-dimensional model picking detection module, configured to determine each two-dimensional model included in the second image frame; determine, by using the central processing unit, whether location information carried by each two-dimensional model is matched with the trigger location information; and obtain a model identifier of a two-dimensional model with location information successfully matched, and determine, based on the obtained model identifier of the two-dimensional model, the picked object specified by the trigger operation.

In some embodiments, the writing module 103 is further configured to store, by using the graphics processing unit, when location information of a pixel associated with any three-dimensional model is not successfully matched with the trigger location information, pixel information corresponding to the pixel that is associated with the three-dimensional model and that is not successfully matched, to the color buffer.

In some embodiments, the apparatus for detecting a picked object further includes: a refreshing module, configured to obtain, after the trigger operation ends, pixel information of a pixel associated with each model in a third image frame, the third image frame being a next image frame of the second image frame; and refresh, based on the pixel information of the pixel associated with each model in the third image frame, the information stored in the color buffer, to render the third image frame to the display interface for display, the model including at least one of a three-dimensional model or a two-dimensional model.

In some embodiments, the writing module 103 is further configured to transmit the trigger location information to the graphics processing unit by using the central processing unit; and store the trigger location information to a uniform variable of a shader corresponding to a draw call by using the graphics processing unit. The matching module is specifically configured to obtain the trigger location information from the uniform variable by using the graphics processing unit, and match the location information of the pixel associated with each three-dimensional model with the trigger location information.

In some embodiments, the writing module 103 is specifically configured to obtain the pixel with the location information successfully matched; query, when information has been stored at the storage location that corresponds to the successfully matched pixel and that is in the color buffer, a first depth value that is associated with the stored information and that is in a depth buffer; obtain a second depth value corresponding to the successfully matched pixel; and store, by using the graphics processing unit, when the second depth value is less than the first depth value, the model identifier of the three-dimensional model associated with the pixel with the location information successfully matched, to the storage location that corresponds to the successfully matched pixel and that is in the color buffer.

In some embodiments, the writing module 103 is further configured to keep, when the second depth value is greater than the first depth value, the information stored at the storage location that corresponds to the successfully matched pixel and that is in the color buffer unchanged.

In some embodiments, the writing module 103 is specifically configured to obtain, by using the graphics processing unit, the model identifier of the three-dimensional model associated with the pixel with the location information successfully matched, and perform a bitwise operation on the model identifier of the three-dimensional model to obtain an identifier bitwise operation result; split the identifier bitwise operation result into a first endian and a second endian; and store the first endian to a red component at the storage location that corresponds to the successfully matched pixel and that is in the color buffer, store the second endian to a green component at the storage location, and store a preset check value to a blue component at the storage location.

In some embodiments, the reading module 104 is specifically configured to obtain the check value from the read blue component; perform a check on the check value, and obtain, when the check succeeds, the first endian from the read red component, and obtain the second endian from the read green component; determine the identifier bitwise operation result based on the first endian and the second endian; and convert the identifier bitwise operation result to obtain the model identifier.

In some embodiments, the apparatus for detecting a picked object further includes: a response module, configured to obtain a pre-configured correspondence between an object and a response result; find a target response result corresponding to the picked object from the correspondence; and display the target response result on the display interface.

In some embodiments, the determining module 101 is specifically configured to obtain a pixel covered by the click/tap operation on the display interface; determine a coverage region of the click/tap operation on the display interface based on the pixel covered by the click/tap operation on the display interface; and determine a target location point in the coverage region, and use location information of the target location point in the display interface as the trigger location information.

Each module in the apparatus for detecting a picked object may be implemented entirely or partially by software, hardware, or a combination thereof. Each module may be embedded in or independent of a processor in a computer device in a hardware form, or may be stored in a memory in a computer device in a software form, to facilitate the processor to call the module to perform an operation corresponding to the module. In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

In some embodiments, a computer device is provided. The computer device may be a terminal, with an internal structure shown in FIG. 11. The computer device includes a processor, a memory, an input/output interface, a communication interface, a display unit, and an input apparatus. The processor, the memory, and the input/output interface are connected by a system bus. The communication interface, the display unit, and the input apparatus are connected to the system bus through the input/output interface. The processor of the computer device is configured to provide computation and control capabilities. The memory of the computer device includes a non-volatile storage medium and an internal memory. The non-volatile storage medium stores an operating system and a computer program. The internal memory provides an environment for running the operating system and the computer program in the non-volatile storage medium. The input/output interface of the computer device is configured to exchange information between the processor and an external device. The communication interface of the computer device is configured to communicate with an external terminal in a wired or wireless manner. The wireless manner may be implemented by Wi-Fi, a mobile cellular network, near field communication (NFC), or other technology. The computer program is executed by the processor to implement a method for detecting a picked object. The display unit of the computer device is configured to form a visible picture and may be a display screen, a projection apparatus, or a virtual reality imaging device. The display screen may be a liquid crystal display screen or an e-ink display screen. The input apparatus of the computer device may be a touch layer covering the display screen, or may be a button, a trackball, or a touchpad disposed on a housing of the computer device, or may be an external keyboard, a touchpad, a mouse, or the like.

Figure 11:
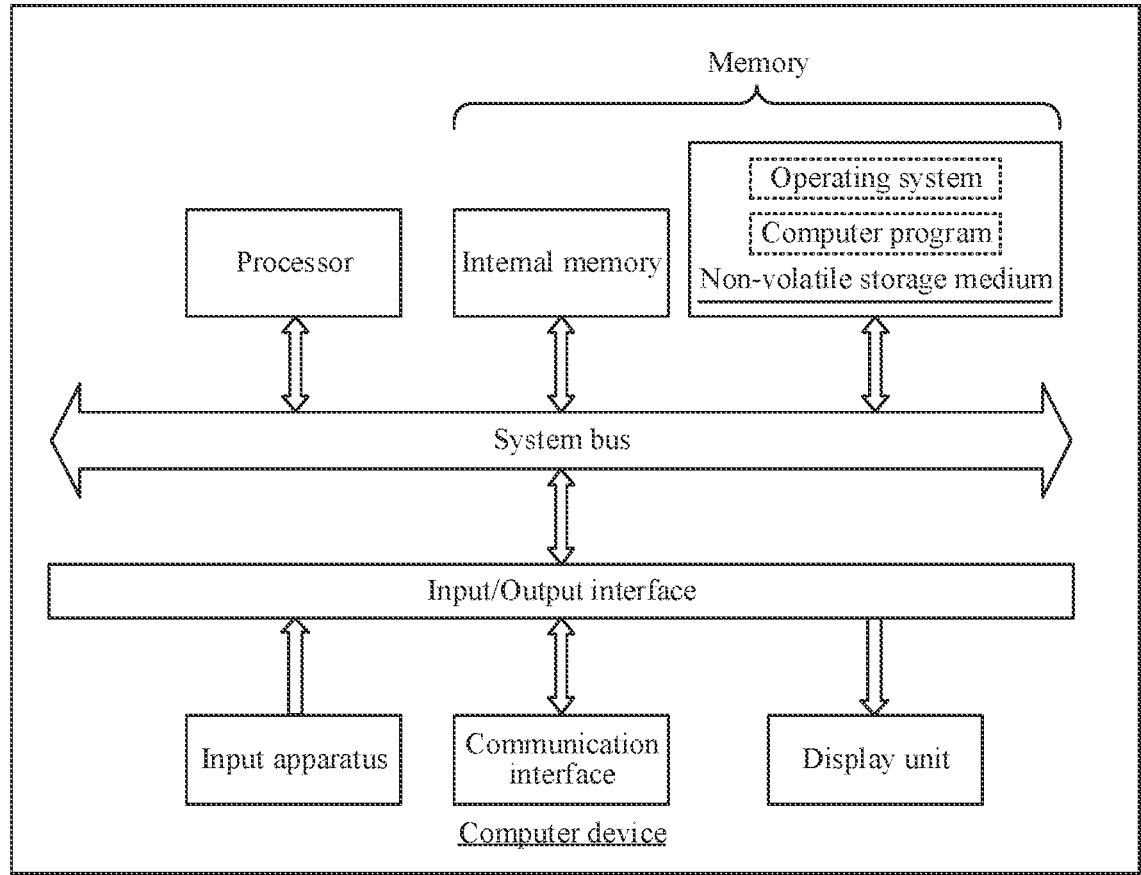
FIG. 11 is a diagram of an internal structure of a computer device according to an embodiment.

A person skilled in the art may understand that the structure shown in FIG. 11 is merely a block diagram of a partial structure related to a solution in this application, and does not constitute a limitation to the computer device to which the solution in this application is applied. Specifically, the computer device may include more or fewer components than those shown in the figures, or have some components combined, or have a different component deployment.

In some embodiments, a computer device is further provided, including a memory and one or more processors, the memory storing computer-readable instructions, and the computer-readable instructions, when executed by the one or more processors, causing the one or more processors to perform the steps in the foregoing method embodiments.

In some embodiments, one or more non-volatile readable storage media are further provided, storing computer-readable instructions, the computer-readable instructions, when executed by one or more processors, causing the one or more processors to implement the steps in the foregoing method embodiments.

In some embodiments, a computer program product is provided, including computer-readable instructions. The computer-readable instructions are executed by a processor to implement the steps in the foregoing method embodiments.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be included. References to the memory, the database, or another medium used in the embodiments provided in this application may all include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, and the like. The volatile memory may include a random access memory (RAM) or an external cache. As an illustration but not a limitation, the RAM may be in various forms, such as a static random access memory (SRAM) or a dynamic random access memory (DRAM). The database involved in the embodiments provided in this application may include at least one of a relational database and a non-relational database. The non-relational database may include a blockchain-based distributed database and the like, which is not limited thereto. The processor involved in the embodiments provided in this application may be a general-purpose processor, a central processing unit, a graphics processing unit, a digital signal processor, a programmable logic device, a data processing logic device based on quantum computing, or the like, which is not limited thereto.

The technical features of the foregoing embodiments can be randomly combined. To make the description concise, all possible combinations of the technical features of the foregoing embodiments have not been described. However, as long as there is no contradiction in the combinations of these technical features, the combinations have to be considered as the scope described in this specification.

The foregoing embodiments are merely illustrations of several implementations of this application and the description thereof is more specific and detailed, but cannot therefore be construed as limiting the scope of this application. For a person of ordinary skill in the art, several transformations and improvements can be made without departing from the concept of this application. These transformations and improvements fall within the protection scope of this application. Therefore, the protection scope of this application shall be subject to the appended claims.

What is claimed is:

1. A method for detecting a picked object performed by a computer device, the method comprising:

detecting trigger location information of a trigger operation when a display interface displays a first image frame, the first image frame being any image frame in an updating process of the display interface being at a preset frequency;

in a process of rendering a second image frame by using a graphics processing unit, obtaining location information of a pixel associated with each three-dimensional model in the second image frame, and matching the location information of the pixel associated with each three-dimensional model with the trigger location information, the second image frame being an Nth image frame after the first image frame, and N being a positive integer;

storing, by using the graphics processing unit, a model identifier of a three-dimensional model associated with a pixel with location information successfully matched with the trigger location information, to a storage location in a color buffer that corresponds to the successfully matched pixel; and obtaining the model identifier in the color buffer by using a central processing unit, and determining, based on the obtained model identifier, the picked object specified by the trigger operation.

2. The method according to claim 1, wherein the method further comprises:

determining each two-dimensional model comprised in the second image frame;

determining, by using the central processing unit, whether location information carried by each two-dimensional model is matched with the trigger location information; and obtaining a model identifier of a two-dimensional model successfully matched with the trigger location information, and determining, based on the obtained model identifier of the two-dimensional model, the picked object specified by the trigger operation.

3. The method according to claim 1, wherein the method further comprises:

storing, by using the graphics processing unit, when location information of a pixel associated with any three-dimensional model is not successfully matched with the trigger location information, pixel information corresponding to the pixel that is associated with the three-dimensional model and that is not successfully matched, to the color buffer.

4. The method according to claim 1, wherein the method further comprises:

obtaining, after the trigger operation ends, pixel information of a pixel associated with each model in a third image frame, the third image frame being a next image frame of the second image frame; and refreshing, based on the pixel information of the pixel associated with each model in the third image frame, the information stored in the color buffer, to render the third image frame to the display interface for display, the model comprising at least one of a three-dimensional model or a two-dimensional model.

5. The method according to claim 1, wherein the method further comprises:

transmitting the trigger location information to the graphics processing unit by using the central processing unit; and storing the trigger location information to a uniform variable of a shader corresponding to a draw call by using the graphics processing unit; and obtaining the trigger location information from the uniform variable by using the graphics processing unit, and matching the location information of the pixel associated with each three-dimensional model with the trigger location information.

6. The method according to claim 1, wherein the storing, by using the graphics processing unit, a model identifier of a three-dimensional model associated with a pixel with location information successfully matched with the trigger location information, to a storage location in a color buffer that corresponds to the successfully matched pixel comprises:

obtaining the pixel with the location information successfully matched;

querying, when information has been stored at the storage location that corresponds to the successfully matched pixel and that is in the color buffer, a first depth value that is associated with the stored information and that is in a depth buffer;

obtaining a second depth value corresponding to the successfully matched pixel; and storing, by using the graphics processing unit, when the second depth value is less than the first depth value, the model identifier of the three-dimensional model associated with the pixel with the location information successfully matched, to the storage location that corresponds to the successfully matched pixel and that is in the color buffer.

7. The method according to claim 1, wherein the storing, by using the graphics processing unit, a model identifier of a three-dimensional model associated with a pixel with location information successfully matched with the trigger location information, to a storage location in a color buffer that corresponds to the successfully matched pixel comprises:

obtaining, by using the graphics processing unit, the model identifier of the three-dimensional model associated with the pixel with the location information successfully matched, and performing a bitwise operation on the model identifier of the three-dimensional model to obtain an identifier bitwise operation result;

splitting the identifier bitwise operation result into a first endian and a second endian; and storing the first endian to a red component at the storage location that corresponds to the successfully matched pixel and that is in the color buffer, storing the second endian to a green component at the storage location, and storing a preset check value to a blue component at the storage location.

8. The method according to claim 1, wherein the method further comprises:

obtaining a pre-configured correspondence between an object and a response result;

finding a target response result corresponding to the picked object from the correspondence; and displaying the target response result on the display interface.

9. The method according to claim 1, wherein the trigger operation is a click/tap operation, and the detecting trigger location information of a trigger operation comprises:

obtaining a pixel covered by the click/tap operation on the display interface;

determining a coverage region of the click/tap operation on the display interface based on the pixel covered by the click/tap operation on the display interface; and determining a target location point in the coverage region, and using location information of the target location point in the display interface as the trigger location information.

10. A computer device, comprising a memory and one or more processors, the memory storing computer-readable instructions, and the computer-readable instructions, when executed by the one or more processors, causing the computer device to perform a method for detecting a picked object including:

detecting trigger location information of a trigger operation when a display interface displays a first image frame, the first image frame being any image frame in an updating process of the display interface being at a preset frequency;

in a process of rendering a second image frame by using a graphics processing unit, obtaining location information of a pixel associated with each three-dimensional model in the second image frame, and matching the location information of the pixel associated with each three-dimensional model with the trigger location information, the second image frame being an Nth image frame after the first image frame, and N being a positive integer;

storing, by using the graphics processing unit, a model identifier of a three-dimensional model associated with a pixel with location information successfully matched with the trigger location information, to a storage location in a color buffer that corresponds to the successfully matched pixel; and obtaining the model identifier in the color buffer by using a central processing unit, and determining, based on the obtained model identifier, the picked object specified by the trigger operation.

11. The computer device according to claim 10, wherein the method further comprises:

determining each two-dimensional model comprised in the second image frame;

determining, by using the central processing unit, whether location information carried by each two-dimensional model is matched with the trigger location information; and obtaining a model identifier of a two-dimensional model successfully matched with the trigger location information, and determining, based on the obtained model identifier of the two-dimensional model, the picked object specified by the trigger operation.

12. The computer device according to claim 10, wherein the method further comprises:

storing, by using the graphics processing unit, when location information of a pixel associated with any three-dimensional model is not successfully matched with the trigger location information, pixel information corresponding to the pixel that is associated with the three-dimensional model and that is not successfully matched, to the color buffer.

13. The computer device according to claim 10, wherein the method further comprises:

obtaining, after the trigger operation ends, pixel information of a pixel associated with each model in a third image frame, the third image frame being a next image frame of the second image frame; and refreshing, based on the pixel information of the pixel associated with each model in the third image frame, the information stored in the color buffer, to render the third image frame to the display interface for display, the model comprising at least one of a three-dimensional model or a two-dimensional model.

14. The computer device according to claim 10, wherein the method further comprises:

transmitting the trigger location information to the graphics processing unit by using the central processing unit; and storing the trigger location information to a uniform variable of a shader corresponding to a draw call by using the graphics processing unit; and obtaining the trigger location information from the uniform variable by using the graphics processing unit, and matching the location information of the pixel associated with each three-dimensional model with the trigger location information.

15. The computer device according to claim 10, wherein the storing, by using the graphics processing unit, a model identifier of a three-dimensional model associated with a pixel with location information successfully matched with the trigger location information, to a storage location in a color buffer that corresponds to the successfully matched pixel comprises:

obtaining the pixel with the location information successfully matched;

querying, when information has been stored at the storage location that corresponds to the successfully matched pixel and that is in the color buffer, a first depth value that is associated with the stored information and that is in a depth buffer;

obtaining a second depth value corresponding to the successfully matched pixel; and storing, by using the graphics processing unit, when the second depth value is less than the first depth value, the model identifier of the three-dimensional model associated with the pixel with the location information successfully matched, to the storage location that corresponds to the successfully matched pixel and that is in the color buffer.

16. The computer device according to claim 10, wherein the storing, by using the graphics processing unit, a model identifier of a three-dimensional model associated with a pixel with location information successfully matched with the trigger location information, to a storage location in a color buffer that corresponds to the successfully matched pixel comprises:

obtaining, by using the graphics processing unit, the model identifier of the three-dimensional model associated with the pixel with the location information successfully matched, and performing a bitwise operation on the model identifier of the three-dimensional model to obtain an identifier bitwise operation result;

splitting the identifier bitwise operation result into a first endian and a second endian; and storing the first endian to a red component at the storage location that corresponds to the successfully matched pixel and that is in the color buffer, storing the second endian to a green component at the storage location, and storing a preset check value to a blue component at the storage location.

17. The computer device according to claim 10, wherein the method further comprises:

obtaining a pre-configured correspondence between an object and a response result;

finding a target response result corresponding to the picked object from the correspondence; and displaying the target response result on the display interface.

18. The computer device according to claim 10, wherein the trigger operation is a click/tap operation, and the detecting trigger location information of a trigger operation comprises:

obtaining a pixel covered by the click/tap operation on the display interface;

determining a coverage region of the click/tap operation on the display interface based on the pixel covered by the click/tap operation on the display interface; and determining a target location point in the coverage region, and using location information of the target location point in the display interface as the trigger location information.

19. One or more non-transitory readable storage media, storing computer-readable instructions, the computer-readable instructions, when executed by one or more processors of a computer device, causing the computer device to implement a method for detecting a picked object including:

detecting trigger location information of a trigger operation when a display interface displays a first image frame, the first image frame being any image frame in an updating process of the display interface being at a preset frequency;

in a process of rendering a second image frame by using a graphics processing unit, obtaining location information of a pixel associated with each three-dimensional model in the second image frame, and matching the location information of the pixel associated with each three-dimensional model with the trigger location information, the second image frame being an Nth image frame after the first image frame, and N being a positive integer;

storing, by using the graphics processing unit, a model identifier of a three-dimensional model associated with a pixel with location information successfully matched with the trigger location information, to a storage location in a color buffer that corresponds to the successfully matched pixel; and obtaining the model identifier in the color buffer by using a central processing unit, and determining, based on the obtained model identifier, the picked object specified by the trigger operation.

20. The non-transitory readable storage media according to claim 19, wherein the method further comprises:

determining each two-dimensional model comprised in the second image frame;

determining, by using the central processing unit, whether location information carried by each two-dimensional model is matched with the trigger location information; and obtaining a model identifier of a two-dimensional model successfully matched with the trigger location information, and determining, based on the obtained model identifier of the two-dimensional model, the picked object specified by the trigger operation.

\* \* \* \* \*